(12) United States Patent
Morikawa et al.

(10) Patent No.: US 11,352,751 B2
(45) Date of Patent: Jun. 7, 2022

(54) RELEASE-PAPER BASE PAPER AND METHOD FOR PRODUCING SAME, AND RELEASE PAPER

(71) Applicant: KURARAY CO., LTD., Kurashiki (JP)

(72) Inventors: Keisuke Morikawa, Kurashiki (JP); Taeko Kaharu, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 313 days.

(21) Appl. No.: 16/498,507

(22) PCT Filed: Mar. 29, 2018

(86) PCT No.: PCT/JP2018/013348
§ 371 (c)(1),
(2) Date: Sep. 27, 2019

(87) PCT Pub. No.: WO2018/181762
PCT Pub. Date: Oct. 4, 2018

(65) Prior Publication Data
US 2020/0032458 A1 Jan. 30, 2020

(30) Foreign Application Priority Data
Mar. 30, 2017 (JP) .............................. JP2017-069081

(51) Int. Cl.
| D21H 27/00 | (2006.01) |
| C09D 129/04 | (2006.01) |
| D21H 19/12 | (2006.01) |
| D21H 19/32 | (2006.01) |
| D21H 19/82 | (2006.01) |
| D21H 21/16 | (2006.01) |
| C08K 5/092 | (2006.01) |

(52) U.S. Cl.
CPC ......... *D21H 27/001* (2013.01); *C09D 129/04* (2013.01); *D21H 19/12* (2013.01); *D21H 19/32* (2013.01); *D21H 19/824* (2013.01); *D21H 21/16* (2013.01); *C08K 5/092* (2013.01)

(58) Field of Classification Search
CPC ...... D21H 27/001; D21H 21/16; D21H 19/32; D21H 19/824; D21H 19/12; C09D 129/04; C08K 5/092
USPC ...................................................... 428/511
See application file for complete search history.

(56) References Cited

U.S. PATENT DOCUMENTS

| 5,387,638 A | 2/1995 | Nakamae et al. |
| 6,153,054 A | 11/2000 | Reinhardt |
| 2003/0134131 A1* | 7/2003 | Yamamoto ........... C09D 183/04 428/447 |
| 2005/0126729 A1 | 6/2005 | Koskinen et al. |
| 2005/0154120 A1* | 7/2005 | Echt ..................... C09D 129/04 524/503 |
| 2008/0171825 A1 | 7/2008 | Echt et al. |
| 2008/0176993 A1 | 7/2008 | Echt et al. |
| 2008/0176998 A1 | 7/2008 | Echt et al. |
| 2013/0040134 A1 | 2/2013 | Dufour et al. |
| 2014/0121099 A1 | 5/2014 | Taoka et al. |
| 2014/0235778 A1 | 8/2014 | Taoka et al. |
| 2016/0251466 A1* | 9/2016 | Kato ..................... B65D 65/42 428/32.39 |

FOREIGN PATENT DOCUMENTS

| EP | 0 587 114 A2 | 3/1994 |
| EP | 2 759 571 A1 | 7/2014 |
| EP | 3 045 480 A1 | 7/2016 |
| JP | 8-3221 A | 1/1996 |
| JP | 8-284099 A | 10/1996 |
| JP | 10-510891 A | 10/1998 |
| JP | 11-277893 A | 10/1999 |
| JP | 11-323788 A | 11/1999 |
| JP | 11-323793 A | 11/1999 |
| JP | 11323788 A | * 11/1999 |
| JP | 2003-55889 A | 2/2003 |
| JP | 2005-120115 A | 5/2005 |
| JP | 2005-194672 A | 7/2005 |
| JP | 2005-314859 A | 11/2005 |
| JP | 2009-209469 A | 9/2009 |
| JP | 2010-236128 A | 10/2010 |
| JP | 2011-214158 A | 10/2011 |
| JP | 2013-531136 A | 8/2013 |
| JP | 2014-198922 A | 10/2014 |
| WO | WO 03/100167 A1 | 12/2003 |
| WO | WO 2005/059248 A1 | 6/2005 |
| WO | WO 2012/173127 A1 | 12/2012 |

OTHER PUBLICATIONS

Itaconic acid, Chemical Book, 2017. (Year: 2017).*
Extended European Search Report dated Dec. 11, 2020 in European Patent Application No. 18778285.9, 7 pages.
International Search Report dated Jun. 5, 2018 in PCT/JP2018/013348 filed on Mar. 29, 2018.

* cited by examiner

*Primary Examiner* — Hui H Chin
(74) *Attorney, Agent, or Firm* — Oblon, McClelland, Maier & Neustadt, L.L.P.

(57) ABSTRACT

Release paper base paper, includes: a substrate; and a coating agent containing a polyvinyl alcohol (A) and a compound (B), the substrate coated with the coating agent, wherein the compound (B) is unsaturated carboxylic acid or a derivative thereof having a pKa of less than 4.00, and 0.1 part by mass or more and 20 parts by mass or less of the compound (B) is contained based on 100 parts by mass of the polyvinyl alcohol (A). The release paper base paper of the present invention is excellent in sealing properties for silicone and waterproofness. The release paper base paper of the present invention is also capable of accelerating curing of silicone in a release layer.

7 Claims, No Drawings

RELEASE-PAPER BASE PAPER AND METHOD FOR PRODUCING SAME, AND RELEASE PAPER

TECHNICAL FIELD

The present invention relates to release paper base paper, including: a substrate; and a coating agent containing a polyvinyl alcohol (A) and a compound (B), the substrate coated with the coating agent, and a method of producing the same. The present invention also relates to release paper including: the release paper base paper; and a release layer formed on a surface of the release paper base paper.

BACKGROUND ART

Polyvinyl alcohols (hereinafter, may be abbreviated as "PVAs") are specific synthetic polymers with crystallinity and hydrophilicity, and in the field of paper, are used as paper strength additives, dispersants for fluorescent white pigments, and binders for inorganic matters (calcium carbonate, clay, silica, etc.). PVAs are also excellent in film formability and are thus capable of giving barrier properties to gas and the like and greaseproofness by being applied on a substrate, such as paper, for coating. Paper coated with such a PVA is sometimes used as barrier paper, and representative examples of the barrier paper may include release paper base paper. Release paper base paper is usually produced by coating a surface of a cellulose substrate with a PVA. On a surface of the release paper base paper, a release layer (silicone layer) is formed to obtain release paper. The PVA in such release paper serves as a filler to inhibit penetration of expensive silicone and platinum into the substrate paper.

Patent Document 1 describes release paper base paper coated with a PVA having a specific silyl group. The release paper base paper is excellent in barrier properties to organic solvents. Accordingly, when the release paper base paper is coated with a coating liquid containing an organic solvent, it is supposedly possible to prevent absorption of the coating liquid by the paper. Meanwhile, the effect of accelerating curing silicone in a mold release layer is insufficient.

Patent Document 2 describes a cellulose substrate coated with a PVA having double bonds introduced into side chains by acetalization reaction. Acetalization reaction usually uses highly volatile acid, such as hydrochloric acid and nitric acid, and such acid remaining in the acetalized PVA thus causes corrosion of the device in the coating step, which has been expected to be improved.

PRIOR ART DOCUMENTS

Patent Documents

Patent Document 1 JP 2005-194672 A
Patent Document 2 JP 2013-531136 A

SUMMARY OF THE INVENTION

Problems to be Solved by the Invention

The present invention has made to solve the above problems and it is an object thereof to provide release paper base paper, excellent in sealing properties for silicone and waterproofness and is capable of accelerating curing of silicone in the release layer, and a method of producing the same. It is also an object of the present invention to provide release paper obtained using the release paper base paper.

Means for Solving the Problems

The present inventors have been studied intensively to solve the above problems, and as a result, they have found that release paper base paper, comprising: a substrate; and a coating agent containing a polyvinyl alcohol (A) and a compound (B), the substrate coated with the coating agent, is excellent in sealing properties for silicone and waterproofness and also accelerates curing of silicone in the release layer and thus have come to complete the present invention.

That is, the above problems are solved by providing release paper base paper, comprising: a substrate; and a coating agent containing a polyvinyl alcohol (A) and a compound (B), the substrate coated with the coating agent, wherein the compound (B) is unsaturated carboxylic acid or a derivative thereof having a pKa of less than 4.00, and 0.1 part by mass or more and 20 parts by mass or less of the compound (B) is contained based on 100 parts by mass of the polyvinyl alcohol (A).

At this time, it is preferred that the compound (B) is itaconic acid, maleic acid, fumaric acid, citraconic acid, or a derivative thereof.

In addition, at this time, it is preferred that the polyvinyl alcohol (A) has a viscosity-average degree of polymerization of 700 or more and less than 5000 and has a degree of saponification of 70.0 mol % or more and 99.9 mol % or less. It is also preferred that the polyvinyl alcohol (A) has ethylene units in a main chain and an amount of modification of the ethylene units is 1 mol % or more and 10 mol % or less.

The above problems are solved by providing a method of producing the release paper base paper, comprising: a first step of obtaining the coating agent by dissolving the polyvinyl alcohol (A) and the compound (B) in water; and a second step of coating the substrate with the coating agent obtained in the first step.

A preferred embodiment of the present invention is release paper, comprising: the above release paper base paper; and a release layer formed on a surface of the release paper base paper. At this time, it is preferred that the release layer contains addition-type silicone (D) and platinum (E) and 0.001 part by mass or more and 0.05 part by mass or less of the platinum (E) is contained based on 100 parts by mass of the addition-type silicone (D).

Effects of the Invention

The release paper base paper of the present invention is excellent in sealing properties for silicone and waterproofness. The release paper base paper of the present invention is also capable of accelerating curing of silicone in the release layer. Accordingly, use of the release paper base paper of the present invention allows reduction in time taken for a step of curing the addition-type silicone in production of the release paper.

MODES FOR CARRYING OUT THE INVENTION (Release Paper Base Paper)

The present invention relates to release paper base paper including: a substrate; and a coating agent containing a polyvinyl alcohol (A) (hereinafter, may be abbreviated as "a PVA (A)") and a compound (B), the substrate coated with the coating agent. The release paper base paper of the present invention has high air permeability and is excellent in sealing properties for silicone. The release paper base paper of the present invention is also excellent in waterproofness. Use of such release paper base paper further allows acceleration of curing of addition-type silicone in a release layer.

A method of producing the release paper base paper of the present invention preferably includes, but not particularly limited to, a first step of obtaining the coating agent by dissolving the PVA (A) and the compound (B) in water and a second step of coating the substrate with the coating agent obtained in the first step.

In the present invention it is important that the release paper base paper contains 0.1 part by mass or more and 20 parts by mass or less of the compound (B) based on 100 parts by mass of the PVA (A). If the amount of the compound (B) is less than 0.1 part by mass, it is not possible to accelerate curing of the addition-type silicone in the release layer. The amount of the compound (B) is preferably 0.5 part by mass or more and more preferably 1.0 parts by mass or more. Meanwhile, if the amount of the compound (B) is more than 20 parts by mass, the sealing properties for silicone and the waterproofness are insufficient. It is also not possible to accelerate curing of the addition-type silicone in the release layer. The amount of the compound (B) is preferably 10 parts by mass or less and more preferably 8 parts by mass or less.

Use of such release paper base paper allows acceleration of curing of the addition-type silicone in the release layer. Use of the release paper base paper of the present invention thus allows reduction in time taken for a step of curing the addition-type silicone in production of release paper. Although the reason is not fully certain yet, it is assumed as follows. First, the PVA (A) and the compound (B) form a complex, which is considered to cause fixation of the double bonds of the compound (B) on a surface of the substrate. Then, the surface is coated with the addition-type silicone for curing reaction. The fixed double bonds react with the addition-type silicone during hydrosilylation reaction, which is considered to cause acceleration of an increase in molecular weight and curing of the silicone.

(PVA (A))

The PVA (A) used for the present invention is not particularly limited and a known PVA may be used. The PVA (A) preferably has a degree of saponification of 70.0 mol % or more and 99.9 mol % or less. If the degree of saponification is less than 70.0 mol %, the water solubility decreases and thus it sometimes becomes difficult to prepare the coating agent. In addition, the waterproofness of the release paper base paper sometimes decreases. If a coating agent is prepared using a PVA (A) having a degree of saponification of less than 70.0 mol %, the coating agent turns out to have a cloud point, which may cause phase separation during coating and drying and a failure of formation of a uniform coated surface and sometimes leads to a decrease in the sealing effect for silicone. The degree of saponification is more preferably 80.0 mol % or more and even more preferably 90.0 mol % or more. Meanwhile, a PVA (A) having a degree of saponification of more than 99.9 mol % is difficult to produce. The degree of saponification is more preferably 99.5 mol % or less. In addition, PVAs having different degrees of saponification may be used in combination as long as the PVAs have a degree of saponification in the above range. The degree of saponification is a value obtained by the method described in JIS-K 6726: 1994.

The PVA (A) preferably has a viscosity-average degree of polymerization (hereinafter, may be abbreviated as "a degree of polymerization") of, but not particularly limited to, 700 or more and less than 5000. The degree of polymerization in the above range even more improves the sealing properties for silicone and the waterproofness of the release paper base paper. The degree of polymerization is more preferably 900 or more and even more preferably 1000 or more. The degree of polymerization is more preferably 4000 or less, even more preferably 3000 or less, and particularly preferably 2000 or less. The degree of polymerization is a value obtained by the method described in JIS-K 6726: 1994. Specifically, when the degree of saponification is less than 99.5 mol %, the PVA is saponified to have a degree of saponification of 99.5 mol % or more and the viscosity-average degree of polymerization (P) is obtained by an equation below using the limiting viscosity [n] (liter/g) measured at 30° C. in water.

$$P=([n] \times 10^4/8.29)^{(1/0.62)}$$

The PVA (A) may be an unmodified PVA or may be a modified PVA. Examples of the modified PVA may include, but not particularly limited to, PVAs having structural units derived from an α-olefin monomer having a carbon number of 4 or less, PVAs having an anionic group derived from sulfonic acid, carboxylic acid, or the like, PVAs having a cationic group such as a quaternary amine group, PVAs having an amide group, PVAs having an acetoacetyl group, PVAs having a diacetoneacrylamide group, PVAs having a silanol group, and the like. One type of the PVA (A) may be used singly or two or more types of it may be used together.

The PVA (A) is preferably a PVA having structural units derived from an α-olefin monomer having a carbon number of 4 or less or a PVA having a carboxyl group. Use of such a PVA (A) allows improvement in the sealing properties for silicone of the release paper base paper. Among all, the PVA (A) is preferably a PVA having structural units derived from an α-olefin monomer having a carbon number of 4 or less, allowing improvement in the waterproofness and improvement in the adhesion between a filling layer and the release layer. Accordingly, even when the release paper is stored at high temperatures and humidity, the interlayer adhesion does not easily decrease and it is possible to prevent degradation in a long term.

Examples of the structural units derived from an α-olefin monomer having a carbon number of 4 or less may include structural units derived from an ethylene monomer, structural units derived from a propylene monomer, structural units derived from an n-butene monomer, structural units derived from an isobutene monomer, and the like. It is preferred that the PVA (A) has ethylene units in a main chain and an amount of modification of the ethylene units is 1 mol % or more and 10 mol % or less. Use of such a PVA (A) having ethylene units in a main chain allows even more improvement in the waterproofness. In this context, having the ethylene units in the main chain means that the PVA (A) has structural units (—$CH_2$—$CH_2$—) derived from an ethylene monomer in the main chain. The content of the ethylene units means the number of moles of the structural units derived from ethylene relative to the number of moles of monomer units constituting the main chain of the PVA (A).

If the content of the ethylene units is less than 1 mol %, there is a risk of insufficient waterproofness. The content of the ethylene units is more preferably 1.5 mol % or more and even more preferably 2.5 mol % or more, Meanwhile, if the content of the ethylene units is more than 10 mol %, dissolution of the PVA (A) in water may cause a risk of producing an insoluble matter. The content of the ethylene units is more preferably 8 mol % or less. It is thus possible to produce the PVA (A) having the ethylene units in such a manner by copolymerizing a vinyl ester-based monomer with ethylene to obtain an ethylene-vinyl ester copolymer and then by saponifying the ethylene-vinyl ester copolymer.

<Compound (B)>

It is important that the compound (B) used for the present invention is unsaturated carboxylic acid or a derivative thereof having a pKa of less than 4.00. Use of the unsaturated carboxylic acid or a derivative thereof having a pKa of less than 4.00 as the compound (B) allows production of release paper base paper excellent in sealing properties. Use of such release paper base paper allows acceleration of curing of silicone in the release layer. From the perspective of even more acceleration of curing of silicone in the release layer, the compound (B) preferably has a pKa of 3.90 or less and more preferably 3.85 or less. Meanwhile, the compound (B) usually has a pKa of 1.00 or more and preferably 1.50 or more.

The pKa (acid dissociation exponent) in the present invention means a negative logarithm (equation (2) below) of an acid dissociation constant (Ka) of the chemical equilibrium of unsaturated carboxylic acid (HA) represented by an equation (1) below. In this context, the pKa in the present invention is a value at 25° C. in an infinitely diluted aqueous solution. In the case of a compound having two or more acid dissociation equilibrium reactions, an acid dissociation exponent (pKa) of the compound refers to an acid dissociation exponent in the first acid dissociation equilibrium reaction.

[math 1]

$$HA \rightleftharpoons H^+ + A^- \quad (1)$$

[math 2]

$$pKa = -\log\frac{(H^+)(A^-)}{(HA)} \quad (2)$$

Examples of the unsaturated carboxylic acid having a pKa of less than 4.00 may include itaconic acid (pKa=3.85), citraconic acid (pKa=2.48), mesaconic acid (pKa=3.09), maleic acid (pKa=1.92), fumaric acid (pKa=3.02), aconitic acid (pKa=2.87), phenylmaleic acid, chloromaleic acid, muconic acid, and the like.

Examples of the unsaturated carboxylic acid derivative may include acid anhydrides, ester compounds, amide compounds, imide compounds, metal salts, and the like of unsaturated carboxylic acid. Specific examples may include itaconic anhydride, itaconic acid monoalkyl ester, itaconic acid dialkyl ester, itaconic acid monoamide, itaconic acid diamide, alkali metal salts of itaconic acid, citraconic acid monoalkyl ester, citraconic acid dialkyl ester, citraconic acid monoamide, citraconic acid diamide, alkali metal salts of citraconic acid, mesaconic acid monoalkyl ester, mesaconic acid dialkyl ester, mesaconic acid monoamide, mesaconic acid diamide, alkali metal salts of mesaconic acid, maleic anhydride, maleic acid monoalkyl ester, maleic acid dialkyl ester, maleic acid monoamide, maleic acid diamide, maleimide, N-alkylmaleimide, alkali metal salts of maleic acid, fumaric acid monoalkyl ester, fumaric acid dialkyl ester, fumaric acid monoamide, fumaric acid diamide, alkali metal salts of fumaric acid, and the like.

Among them, the compound (B) is preferably unsaturated carboxylic acid. From the perspective of accelerating curing of silicone in the release layer, it is even more preferably itaconic acid, fumaric acid, or citraconic acid. These examples of the compound (B) do not have to be used singly and two or more types of them may be used by mixing them as needed.

(Method of Producing Release Paper Base Paper)

The release paper base paper of the present invention is release paper base paper including a substrate and a coating agent containing a PVA (A) and a compound (B), the substrate coated with the coating agent. A method of producing the release paper base paper preferably includes, but not particularly limited to: a first step of obtaining the coating agent by dissolving the PVA (A) and the compound (B) in water; and a second step of coating the substrate with the coating agent obtained in the first step.

In the first step, the coating agent is obtained by dissolving the PVA (A) and the compound (B) in water (solvent). The solvent to dissolve the PVA (A) and the compound (B) may contain components other than water. Examples of such other components may include hydrophilic solvents. Examples of the hydrophilic solvents may include; alcohols, such as methanol, ethanol, and isopropanol; ketones, such as acetone and methylethylketone; ethers, such as tetrahydrofuran; cellosolves; carbitols; nitriles, such as acetonitrile; and the like. The content of the components other than water in the solvent is preferably 50 mass % or less and more preferably 20 mass % or less.

The coating agent preferably has a solid content concentration from 2 to 30 mass %. If the solid content concentration is less than 2 mass %, there is a risk that the paper is increasingly impregnated with the coating agent and reducing the sealing effect for silicone. The solid content concentration is more preferably 4 mass % or more. Meanwhile, if the solid content concentration is more than 30 mass %, there is a risk of difficulty in leveling when the coating agent is applied on paper and degradation of the state of the coated surface. The solid content concentration is more preferably 25 mass % or less.

The coating agent in the present invention may contain components other than the PVA (A) and the compound (B) without inhibiting the effects of the present invention. Examples of such other components may include: aqueous dispersible resins, such as SBR latex, NBR latex, vinyl acetate-based emulsions, ethylene/vinyl acetate copolymer emulsions, (meth)acrylic ester-based emulsions, and vinyl chloride-based emulsions; raw starches obtained from wheat, corn, rice, potato, sweet potato, tapioca, sago palm, and the like; raw starch degradation products, such as oxidized starch and dextrin; starch derivatives, such as etherified starch, esterified starch, and cationized starch; cellulose derivatives, such as methylcellulose, hydroxyethylcellulose, and carboxymethylcellulose (CMC); monosaccharides, such as glucose, fructose, isomerized sugar, and xylose; disaccharides, such as maltose, lactose, sucrose, trehalose, palatinose, reduced maltose, reduced palatinose, and reduced lactose; oligosaccharides, such as starch syrup, isomaltooligosaccharide, fructooligosaccharide, lactose oligosaccharide, soybean oligosaccharide, xylooligosaccharide, coupling sugar, and cyclodextrin compounds; polysaccharides, such as pullulan, pectin, agar, konjak mannan, polydextrose, and xanthan gum; albumin; gelatin; casein; gum arabic; polyamide resins; melamine resins; poly(meth) acrylamide; polyvinylpyrrolidone; sodium poly(meth)acrylate; anion modified PVAs; sodium alginate; water soluble polyester; and the like.

Examples of such other components may also include pigments. Examples of the pigments may include inorganic pigments (clay, kaolin, aluminum hydroxide, calcium carbonate, talc, etc.) and organic pigments (plastic pigments, etc.) that are generally used in the field of coated paper production.

Examples of such other components may further include viscosity modifiers, adhesion improvers, defoamer, plasticizers, waterproofing agents, antiseptics, antioxidants, penetrants, surfactants, fillers, starches and derivatives thereof, latexes, and the like.

The content of these other components in the coating agent is usually 50 parts by mass or less based on 100 parts by mass of the PVA (A).

In the second step of obtaining, the substrate is coated with the coating agent obtained in the first step. The substrate to be coated with the coating agent is preferably paper. As the paper, it is possible to use known paper or synthetic paper obtained by papermaking with chemical pulp, such as hardwood kraft pulp and softwood kraft pulp, mechanical pulp, such as GP (groundwood pulp), RGP (refiner groundwood pulp), and TMP (thermomechanical pulp), and the like. As the paper, it is also possible to use wood free paper, wood containing paper, alkaline paper, glassine paper, semi-glassine paper, board and white lined board used for corrugated boards, for building materials, for white lined chipboards, for chipboards, and the like. The paper may contain organic and inorganic pigments and papermaking aids, such as paper strength additives, sizing agents, pH adjusters, drainage aids, dyes, fillers, and retention aids. The paper may also be subjected to various types of surface treatment. As a film substrate, a film substrate is preferably made of a thermoplastic resin. Examples of the thermoplastic resin may include polyolefin, polyester, polyamide, and the like.

Coating with the coating agent may be carried out in general paper coating facilities, and the substrate may be coated with the coating agent as a monolayer or divided into multilayers by an on-machine coater or an off-machine coater equipped with a coating device, such as a blade coater, an air knife coater, a transfer roll coater, a rod metering size press coater, a curtain coater, and a bar coater, for example. Examples of a method of drying after coating to be appropriately employed may include various heat drying methods, such as heating with hot air, heating with a gas heater, and heating with an infrared heater. The amount of coating is preferably from 0.3 to 5.0 g/m$^2$ in terms of solid content. If the amount of coating is less than 0.3 g/m$^2$, there is a risk of reducing the sealing effect for silicone. The amount of coating is more preferably 0.5 g/m$^2$ or more. Meanwhile, if the amount of coating is more than 5.0 g/m$^2$, the surface of a filling layer formed on the substrate may be excessively smooth, causing a decrease in the surface area of the substrate and thus sufficient adhesion with the silicone layer is not sometimes obtained even when the silicone layer is formed later. The amount of coating is more preferably 3.0 g/m$^2$ or less.

In the present invention, as a method to determine the sealing effect for silicone of the filling layer, air permeability may be used that is measured using a smoothness and air permeability tester by the Oken method in accordance with JIS-P 8117: 2009. The air permeability is preferably 2000 sec or more, more preferably 5000 sec or more, even more preferably 10000 sec or more, particularly preferably 30000 sec or more. If the air permeability is less than 2000 sec, there is a risk of a decrease in the sealing effect. A smaller value of the air permeability (sec) means a higher air permeation rate.

In the present invention, as an index to determine waterproofness of the filling layer, it is possible to use water absorbency by a Cobb method in accordance with JIS-P 8140: 1998. The water absorbency (for 60 seconds) is preferably 70 g/m$^2$ or less, more preferably 50 g/m$^2$ or less, and even more preferably 45 g/m$^2$ or less.

To enhance the sealing effect, smoothing treatment may be carried out, without impairing the effect, after coating and drying of the coating agent. Examples of the smoothing treatment to be preferably employed may include super calender, gloss calender, multi-nip calender, soft calender, belt-nip calender, and the like.

(Release Paper)

A preferred embodiment of the present invention is release paper, including: the release paper base paper described above; and a release layer formed on a surface of the release paper base paper. At this time, it is preferred that the release layer contains addition-type silicone (D) and platinum (E) and 0.001 part by mass or more and 0.05 part by mass or less of the platinum (E) is contained based on 100 parts by mass of the addition-type silicone (D). The amount of the platinum (E) in such a range allows production of release paper excellent in silicone curability. If the amount of the platinum (E) is less than 0.001 part by mass, curing of the addition-type silicone (D) does not proceed sufficient and treatment at high temperatures is sometimes required. The amount of the platinum (E) is more preferably 0.002 part by mass or more and even more preferably 0.003 part by mass or more, and particularly preferably 0.004 part by mass or more. Meanwhile, if the amount of the platinum (E) is more than 0.05 part by mass, an economic problem sometimes occurs due to the high cost. The amount of the platinum (E) is more preferably 0.03 part by mass or less and even more preferably 0.02 part by mass or less.

(Addition-Type Silicone (D))

The addition-type silicone (D) used for the present invention is obtained by hydrosilylation reaction of organopolysiloxane (d1) containing at least two carbon-carbon double bonds reactive with a SiH group in one molecule with organohydrogenpolysiloxane (d2) containing at least two SiH groups in one molecule in the presence of a platinum catalyst.

The organopolysiloxane (d1) containing at least two carbon-carbon double bonds reactive with a SiH group in one molecule is organopolysiloxane containing at least two carbon-carbon double bonds in one molecule, such as a vinyl group, an allyl group, a propenyl group, an isopropenyl group, a butenyl group, an isobutenyl group, and a hexenyl group. The organopolysiloxane is exemplified by, for example, those having repeating units of diorganosiloxane in a main chain and a triorganosiloxane structure at an end, and may have a branched or cyclic structure. The organo group bonded to silicon in the end or the repeating units is exemplified by a methyl group, an ethyl group, a phenyl group, and the like. Specific examples may include methylphenylpolysiloxane having vinyl groups at both ends.

The organohydrogenpolysiloxane (d2) containing at least two SiH groups in one molecule is organopolysiloxane containing two or more SiH groups at an end and/or in a repeating structure. The organopolysiloxane is exemplified by, for example, those having repeating units of diorganosiloxane in a main chain and a triorganosiloxane structure at an end, and may have a branched or cyclic structure. The organo group bonded to silicon in the end or the repeating units exemplified by a methyl group, an ethyl group, an octyl group, a phenyl group, and the like, two or more of which being substituted with hydrogen.

The addition-type silicone (D) is appropriately selected from a solvent type, a non-solvent type, and an emulsion type, and from the perspective of reduction in environmental load and coatability, the addition-type silicone of a non-solvent type is preferably employed. Examples of the addition-type silicone (D) of a non-solvent type may include: silicones produced by Dow Corning Toray Co., Ltd., such as SP7015, SP7259, SP7025, SP7248S, SP7268S, SP7030, SP7265S, LTC1006L, and LTC1056L; silicones produced by Shin-Etsu Silicone, such as KNS-3051, KNS-320A, KNS-316, KNS-3002, KNS-3300, and X-62-1387; silicones produced by Wacker Asahikasei Silicone Co., Ltd., such as DEHESIVE920, DEHESIVE921, DEHESIVE924, DEHESIVE927, and DEHESIVE929; silicones produced by Arakawa Chemical Industries, Ltd., such as KF-SL101, KF-SL201 KF-SL202, KF-SL301, and KF-SL302; silicones produced by Momentive Performance Materials Inc., such as TPR6600 and SL6625; and the like. These silicones do not have to be used singly and two or more types of them may be used by mixing them as needed.

(Platinum (E))

For curing of the addition-type silicone (D), a platinum catalyst is usually used, and the type of platinum catalyst used in the present invention is not particularly limited. Those curing the addition-type silicone (D) by hydrosilylation reaction are preferably used. Examples of the platinum catalyst may include: platinum catalysts produced by Dow Corning Toray Co., Ltd., such as SP7077R and SRX212; platinum catalysts produced by Arakawa Chemical Industries, Ltd., such as CATA93B; and the like. These platinum catalysts do not have to be used singly and two or more types of them may be used by mixing them as needed. The amount of the platinum (E) is obtained by determining platinum in the platinum catalyst with an ICP emission spectrophotometer or the like.

(Method of Producing Release Paper)

Although a method of producing the release paper of the present invention is not particularly limited, a preferably employed method includes: coating a substrate with a coating agent containing the PVA (A) and the compound (B) to form a filling layer on the substrate; and then coating the filling layer with a coating liquid prepared to have the addition-type silicone (D) and the platinum (E) in respective amounts of the above ranges to form a release layer. The amount of coating with the coating liquid to form the release layer is preferably, but not particularly limited to, from 0.1 to 5 g/m$^2$ in terms of solid content. If the amount of coating is less than 0.1 g/m$^2$, the release properties are sometimes worse. The amount of coating is more preferably 0.3 g/m$^2$ or more in terms of solid content. If the amount of coating is more than 5 g/m$^2$, there is a risk of reducing the adhesion between the release layer containing the addition-type silicone (D) and the platinum (E) and the filling layer for silicone containing the PVA (A) and the compound (B). The amount of coating is more preferably 3 g/m$^2$ or less in terms of solid content. Although various methods may be used as the coating method, a blade coater, an air knife coater, a bar coater, and the like are preferred.

The release layer in the release paper of the present invention may contain components other than the addition-type silicone (D) and the platinum (E) without inhibiting the effects of the present invention. The amount of such other components to be blended is usually 30 parts by mass or less based on 100 parts by mass of the total amount of the release layer. Examples of such other components may include viscosity modifiers, adhesion improvers, defoamers, plasticizers, waterproofing agents, antiseptics, antioxidants, penetrants, surfactants, inorganic pigments, organic pigments, fillers, starches and derivatives thereof, celluloses and derivatives thereof, saccharides, latexes, and the like.

EXAMPLES

Although an even more detailed description is given below to the present invention with reference to Examples, the present invention is not at all limited to Examples below. In Examples below, "%" and "parts" respectively mean "mass %" and "parts by mass" unless otherwise specified.

[Viscosity-Average Degree of Polymerization of PVA]

The viscosity-average degree of polymerization of the PVA was measured by a method in accordance with JIS-K 6726: 1994. Specifically, when the degree of saponification was less than 99.5 mol %, the PVA was saponified to have a degree of saponification of 99.5 mol % or more and the viscosity-average degree of polymerization (P) was obtained by an equation below using the limiting viscosity [q] (liter/g) measured at 30° C. in water.

$$P=([\eta]\times 10^4/8.29)^{(1/0.62)}$$

[Degree of Saponification of PVA]

The degree of saponification of the PVA was obtained by the method described in JIS-K 6726: 1994.

Example 1

[Preparation of Release Paper Base Paper]
(1) Preparation of Coating Agent

Using a PVA having a viscosity-average degree of polymerization of 2400 and having a degree of saponification of 88 mol % as the PVA (A), a 6% aqueous solution was prepared. To the aqueous PVA (A) solution, an aqueous itaconic acid solution having a pKa$_1$ of 3.85 was added to prepare a coating agent. The coating agent contained 2.95 parts by mass of itaconic acid based on 100 parts by mass of the PVA. The coating agent had a solid content concentration of 6.16 mass %.

(2) Coating Step

Using a bar coater, paper having an air permeability of 100 seconds was coated with the coating agent obtained above. After coating, it was dried at 100° C. for 5 minutes to prepare coated paper. The amount of coating was approximately 1.0 g/m² in terms of solid content.

(3) Calender Treatment

The coated paper obtained above was subjected to super calender treatment to obtain release paper base paper. The release paper base paper thus obtained was subjected to evaluation of air permeability and water absorbency in accordance with methods below. The evaluation results are shown in Table 1.

[Evaluation of Air Permeability of Release Paper Base Paper]

The air permeability of the release paper base paper was measured using a smoothness and air permeability tester of Often method in accordance with JIS-P 8117: 2009. The air permeability was used as an index of sealing properties for silicone. The result is shown in Table 1.

until the silicone was cured. In this context, the time until the silicone was cured means time (seconds) taken until no peeling at all found in the silicone layer while the silicone layer was strongly rubbed 10 times with a finger at predetermined time intervals. The result is shown in Table 1.

Examples 2 Through 9, Comparative Examples 1 Through 5

Release paper base paper and release paper were prepared and evaluated in the same manner as in Example 1 other than changing the type and the amount of the PVA (A) and the type and the amount of the compound (B) as shown in Table 1. The evaluation results are shown in Table 1.

TABLE 1

| | PVA (A) | | | Compound (B) | | | Performance Evaluation of Release Paper Base Paper | | Performance Evaluation of Release Paper |
|---|---|---|---|---|---|---|---|---|---|
| | Viscosity-Average Degree of Polymerization | Saponification (mol %) | Modification Type | Modification Amount (mol %) | Type | pKa | parts by mass *1) | Air Permeability (sec) | Cobb Water Absorbency (g/m²) | Silicone Curability (sec) |
| Example 1 | 2400 | 88 | — | — | Itaconic Acid | 3.85 | 2.95 | 100,000< | 49 | 60 |
| Example 2 | 1000 | 99.5 | Ethylene | 6 | Itaconic Acid | 3.85 | 11.8 | 100,000< | 30 | 60 |
| Example 3 | 1000 | 99.5 | Ethylene | 6 | Itaconic Acid | 3.85 | 0.5 | 100,000< | 22 | 90 |
| Example 4 | 800 | 70 | — | — | Itaconic Acid | 3.85 | 1 | 2,600 | 50< | 120 |
| Example 5 | 1700 | 96 | Ethylene | 5 | Maleic Acid | 1.92 | 2.63 | 100,000< | 26 | 60 |
| Example 6 | 1000 | 99.5 | Ethylene | 6 | Maleic Acid | 1.92 | 5.9 | 100,000< | 28 | 60 |
| Example 7 | 1000 | 99.5 | Ethylene | 6 | Fumaric Acid | 3.02 | 2.63 | 100,000< | 23 | 60 |
| Example 8 | 1700 | 98 | Ethylene | 2 | Fumaric Acid | 3.02 | 2.63 | 100,000< | 26 | 60 |
| Comparative Example 1 | 2400 | 88 | — | — | — | — | — | 100,000< | 40 | 120< |
| Comparative Example 2 | 1000 | 99.5 | Ethylene | 6 | Acrylic Acid | 4.26 | 0.72 | 100,000< | 23 | 120< |
| Comparative Example 3 | 1000 | 99.5 | Ethylene | 6 | Crotonic Acid | 4.17 | 0.86 | 100,000< | 23 | 120< |
| Comparative Example 4 | 1700 | 97 | Ethylene | 2 | Methyl Methacrylate | 4.65*2) | 5 | 100,000< | 23 | 120< |
| Comparative Example 5 | 800 | 70 | — | — | Itaconic Acid | 3.85 | 50 | 1,000> | 50< | 120< |

*1) Amount based on 100 parts by mass of PVA (A).
*2) pKa of Methacrylic Acid.

[Evaluation of Water Absorbency of Release Paper Base Paper]

As an index of the waterproofness of the release paper base paper, the water absorbency for 60 seconds was measured using a water absorbency tester (trade name: Gurley-Cobb Size Tester, manufactured by Kumagai Riki Kogyo Co., Ltd.) in accordance with JIS-P 8140: 1998. The results are shown in Table 1.

[Preparation of Release Paper and Evaluation of Silicone Curability]

On the release paper base paper prepared in (3) above, silicone (LTC1056L) produced by Dow Corning Toray Co., Ltd. was mixed with a platinum catalyst (SRX212) to prepare a coating liquid having a ratio of the addition-type silicone (D) to the platinum (E) at 100/0.007. The release paper base paper was coated with the coating liquid for a coating amount of 2.0 g/m² in terms of solid content. A silicone layer was thus formed on the release paper base paper. It was then heat treated at 110° C. to measure the time

The invention claimed is:

1. A release paper base paper, comprising:
    a substrate; and
    a coating agent comprising a polyvinyl alcohol and a compound, wherein
    the substrate is coated with the coating agent,
    the compound is unsaturated carboxylic acid or a derivative thereof having a pKa of less than 4.00, and
    0.1 part by mass or more and 20 parts by mass or less of the compound is contained based on 100 parts by mass of the polyvinyl alcohol.

2. The release paper base paper according to claim 1, wherein the compound is itaconic acid, maleic acid, fumaric acid, citraconic acid, or a derivative thereof.

3. The release paper base paper according to claim 1, wherein the polyvinyl alcohol has a viscosity-average degree of polymerization of 700 or more and less than 5000 and has a degree of saponification of 70.0 mol % or more and 99.9 mol % or less.

4. The release paper base paper according to claim wherein the polyvinyl alcohol has ethylene units in a main chain and an amount of modification of the ethylene units is 1 mol % or more and 10 mol % or less.

5. A method of producing the release paper base paper according to claim 1, the method comprising:
   obtaining the coating agent by dissolving the polyvinyl alcohol and the compound in water; and
   coating the substrate with the coating agent.

6. A release paper, comprising: the release paper base paper according to claim 1; and a release layer formed on a surface of the release paper base paper.

7. The release paper according to claim 6, wherein the release layer comprises addition-type silicone and platinum and 0.001 part by mass or more and 0.05 part by mass or less of the platinum is contained based on 100 parts by mass of the addition-type silicone.

* * * * *